(12) United States Patent
Torkelson et al.

(10) Patent No.: US 9,938,397 B2
(45) Date of Patent: Apr. 10, 2018

(54) DIRECT USE OF NATURAL ANTIOXIDANT-RICH AGRO-WASTES AS THERMAL STABILIZERS FOR POLYMERS

(71) Applicant: Northwestern University, Evanston, IL (US)

(72) Inventors: John M. Torkelson, Skokie, IL (US); Krishnan A. Iyer, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 15/247,395

(22) Filed: Aug. 25, 2016

(65) Prior Publication Data

US 2017/0058108 A1 Mar. 2, 2017

Related U.S. Application Data

(60) Provisional application No. 62/209,614, filed on Aug. 25, 2015.

(51) Int. Cl.
*C08K 11/00* (2006.01)
(52) U.S. Cl.
CPC ................... *C08K 11/005* (2013.01)
(58) Field of Classification Search
CPC ........................ C08K 11/005; C08K 2201/012
USPC ............................................................. 524/9
See application file for complete search history.

(56) References Cited

U.S. PATENT DOCUMENTS

| | | | |
|---|---|---|---|
| 4,587,318 A | 5/1986 | Inoue et al. | |
| 4,738,815 A | 4/1988 | Friesen | |
| 5,814,673 A | 9/1998 | Khait | |
| 6,180,685 B1 | 1/2001 | Khait | |
| 6,494,390 B1 | 12/2002 | Khait et al. | |
| 7,223,359 B2 | 5/2007 | Torkelson et al. | |
| 2003/0212167 A1* | 11/2003 | Weng ................... | C08K 5/1545 524/16 |
| 2011/0052847 A1* | 3/2011 | Roberts ................... | C08K 5/103 428/35.7 |
| 2015/0148462 A1 | 5/2015 | Masi et al. | |

FOREIGN PATENT DOCUMENTS

| | | |
|---|---|---|
| CN | 103270101 A | 8/2013 |
| CN | 104311952 A | 1/2015 |
| KR | 2013129206 A | 11/2013 |
| WO | 2012066126 A1 | 5/2012 |
| WO | 2014016336 A1 | 1/2014 |
| WO | 2015078886 A1 | 6/2015 |

OTHER PUBLICATIONS

Cerruti et al., Polymer Degradation and Stability, 94, 2095-2100, 2009.*
Syed et al., J. Applied Polymer Science, 118, 1204-1210, 2010.*
Furgiuele, N. et al., "Novel Strategy for Polymer Blend Compatibilization: Solid-State Shear Pulverization", Macromolecules 2000, 33(2), 225-228.
Furgiuele, N. et al., "Efficient Mixing of Polymer Blends of Extreme Viscosity Ratio: Elimination of Phase Inversion Via Solid-State Shear Pulverization", Polym. Eng. Sci. 2000, 40(6), 1447-1457.
Lebovitz, A. et al., "Stabilization of Dispersed Phase to Static Coarsening: Polymer Blend Compatibilization via Solid-State Shear Pulverization", Macromolecules 2002, 35, 8672-8675.
Tao, Y. et al., "Achievement of quasi-nanostructured polymer blends by solid-state shear pulverization and compatibilization by gradient copolymer addition", Polymer 2006, 47, 6773-6781.
Lebovitz, A. et al., "Sub-micron dispersed-phase particle size in polymer blends: overcoming the Taylor limit via solid-state shear pulverization", Polymer 2003, 44, 199-206.
Gregorova, A. et al., "Stabilization effect of lignin in polypropylene and recycled polypropylene", Polym. Degrad. Stab. 2005, 89, 553-558.
Cerruti, P. et al., "Effect of natural antioxidants on the stability of polypropylene films", Polym. Degrad. Stab. 2009, 94, 2095-2100.
Iyer, K. et al., "Cellulose nanocrystal/polyolefin biocomposites prepared by solidstate shear pulverization: Superior dispersion leading to synergistic property enhancements", Polymer 2015, 56, 464-475.
Iyer, K. et al., "Dispersion and Property Enhancements in Polyolefin/Soy Flour Biocomposites Prepared via Melt Extrusion Followed by Solid-State Shear Pulverization", Macromol. Mater. Eng. 2015, 300, 772-784.
Iyer, K. et al., "Green composites of polypropylene and eggshell: Effective biofiller size reduction and dispersion by single-step processing with solid-state shear pulverization", Composites Science and Technology 102 (2014) 152-160.
Larrauri, J. A. et al., "Effect of Drying Temperature on the Stability of Polyphenols and Antioxidant Activity of Red Grape Pomace Peels", J. Agric. Food Chem. 1997, 45, 1390-1393.
Kumar, G. S. et al., "Free and bound phenolic antioxidants in amla (Emblica officinalis) and turmeric (Curcuma longa)", J. Food Compos. Anal. 2006, 19, 446 452.
Panusa, A. et al., "Recovery of Natural Antioxidants from Spent Coffee Grounds", J. Agric. Food Chem. 2013, 61, 4162-4168.
Zhou, W. et al., "Economic Analysis of Ethanol Production from Citrus Peel Waste", Proc. Fla. State Hort. Soc. 2007, 120, 310-315.
Iyer, K. A. et al., "Sustainable green hybrids of polyolefins and lignin yield major improvements in mechanical properties when prepared via solid-state shear pulverization", ACS Sustain. Chem. Eng. 2015, 3, 959-968.
Iyer, K. A. et al., "Novel, synergistic composites of polypropylene and rice husk ash: Sustainable resource prepared hybrids by solid-state shear pulverization", Polym. Compos. 2013, 34, 1211-1221.
Brunner, P. J. et al., "Processing-Structure-Property Relationships in Solid-State Shear Pulverization: Study Parametric of Specific Energy", Polym. Eng. Sci. 2012, 52, 1555-1564.
Ambrogi, V. et al., " Natural antioxidants for polypropylene stabilization", Polym. Degrad. Stab. 2011, 96, 2152-2158.

(Continued)

*Primary Examiner* — Hui H Chin
(74) *Attorney, Agent, or Firm* — Reinhart Boerner Van Deuren s.c.

(57) ABSTRACT

Polymeric compositions comprising as-received organic waste materials comprising an antioxidant component for enhanced thermal stability.

29 Claims, 9 Drawing Sheets

(56) References Cited

OTHER PUBLICATIONS

Walker, A. M. et al., "Polyethylene/starch blends with enhanced oxygen barrier and mechanical properties: Effect of granule morphology damage by solid-state shear pulverization", Polymer 2001, 48, 1066 1074.
Al-Malaika, S. et al, "The antioxidant role of α-tocopherol in polymers II. Melt stabilising effect in polypropylene", Polym. Degrad. Stab. 1999, 64, 145-156.
Peltzer, M. et al., "Determination of Oxidation Parameters by DSC for Polypropylene Stabilized with Hydroxytyrosol (3,4-dihydroxy-phenylethanol)", Journal of Thermal Analysis and Calorimetry, 2009, vol. 96, pp. 243-248.
Kasimatis, K. et al., "Polymer Nanocomposites for the Real World: Achievement of Well Dispersed Nanofiller Sheets, Nanotubes and Nanoparticles by Solid-State Shear Pulverization", Polymeric Materials: Science & Engineering 2005, 92, 255.
International Search Report and Written Opinion for PCT/US2016/048718 dated Nov. 29, 2016, 13 pages.

\* cited by examiner

DIRECT USE OF NATURAL ANTIOXIDANT-RICH AGRO-WASTES AS THERMAL STABILIZERS FOR POLYMERS

This application claims priority to and the benefit of application Ser. No. 62/209,614 filed Aug. 25, 2015—the entirety of which is incorporated herein by reference.

BACKGROUND OF THE INVENTION

Commodity plastics such as polyethylene (PE) and polypropylene (PP) are used in numerous applications ranging from toys, containers and food packaging to prosthetics. Polyolefins are subjected to elevated temperature during conventional melt processing operations such as twin-screw melt extrusion, rotational molding, and thermoforming and are highly susceptible to oxidative degradation. The homolytic cleavage of alkyl hydroperoxides generates free radicals which promote an autocatalytic degradation process. Without an adequate level of thermal stabilizers, polyolefins can undergo oxidative degradation by chain scission and/or chain extension, thereby forming networks and/or low molecular weight fractions. Furthermore, long-term environmental weathering from exposure to ultraviolet radiation and successive melt extrusion associated with recycling can amplify material degradation and deteriorate mechanical performance and optical properties.

Antioxidants are added to polyolefins during processing to improve high-temperature processability, long-term weathering resistance, and recyclability. Sterically hindered phenols are an important class of synthetic antioxidants for polymers. Such hydrogen-donating hindered phenols act as chain-breaking antioxidants that prevent the propagation of free radical reactions by trapping alkyl peroxy radicals. Commercial antioxidants such as Irganox™ I1010 are based on the family of hindered phenols like 4-substituted-2,6-ditertiary butyl phenols. The effectiveness of thermal stabilizers or antioxidants in stabilizing polymers depends on many factors including solubility, dispersion, ability to stabilize different polymer matrices, evaporation or volatilization during processing, conditions of use, and recycling.

However, stabilization of polyolefins with synthetic antioxidants poses potential health issues and environmental challenges. Typical hindered phenols are able migrate to the surfaces of polymeric articles. Plastics that are used for food packaging have come under scrutiny because synthetic antioxidants may contaminate food and serve as a source of unknown cytotoxicity. Few details are known about the toxicity and migration of the transformation products of such antioxidants produced during processing and application. Other environmental concerns arise from the presence of trace levels of heavy metal catalyst used for antioxidant synthesis. Moreover, economic and environmental factors have led to growing interest in using greener, sustainable materials in place of synthetic counterparts as feedstocks for thermoplastics and their composites. Examples range from the use of natural monomers to the fabrication of green polymer composites employing natural or agro-based residues as reinforcements. Such composites provide the benefits of biodegradability, reduced wear to processing equipment, and low cost. In light of these benefits as well as concerns over the use of synthetic antioxidants, numerous bio-based phenols such as caffeic acid, ascorbic acid (vitamin C), α-tocopherol (vitamin E), curcumin, quercetin, and β-carotenes have been incorporated into different packaging materials as thermal stabilizers.

Relating thereto, Al-Malaika et al. examined the efficacy of the commercially-available compound vitamin E as a melt stabilizer for low density polyethylene (LDPE). After four extrusions at 180° C., the unstabilized LDPE control sample showed a 20% decrease in melt flow index (MFI) due to chain branching. In contrast, incorporation of 0.2 wt % vitamin E maintained the viscosity of extruded LDPE nearly constant, resulting in only a 2.5% increase in MFI after four extrusions. Interestingly, the stabilization achieved by incorporating 0.2 wt % vitamin E was better than that by incorporating 0.2 wt % synthetic antioxidants such as Irganox™ I1010 and I1076, both of which led a 7.5% increase in MFI after four extrusions. Tatraaljai et al. similarly investigated the effect of curcumin, found in turmeric and other roots, on the processing stability of PE. Using various characterization techniques, they demonstrated that PE with 0.1 wt % curcumin showed superior thermo-oxidative stability compared to that for PE with 0.1 wt % Irganox™ I1010. They attributed the enhanced stability to the ability of curcumin to arrest alkyl radical propagation and to stabilize hydroperoxy radicals. (Again, the single, isolated compound curcumin was obtained from a commercial source.) Cerruti et al. used ball milling and solvent extraction to obtain antioxidant fractions from grape seeds and tomato skins. Incorporation of such carotenoid antioxidant fractions had positive effects on PP thermal stability. However, solvent extraction of antioxidant fractions and particle size reduction not only add to processing time and cost but also compromise the green, sustainable aspects of such materials. Accordingly, the search continues for natural sources of such antioxidants, aside from specific commercial materials, to better utilize the benefits and advantages available from such compounds.

SUMMARY OF THE INVENTION

In light of the foregoing, it can be an object of the present invention to provide one or more compositions comprising organic agro-waste matter into polymeric materials to affect the thermal stability of such materials, thereby overcoming certain deficiencies of the prior art including those discussed above. It would be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide polymer compositions comprising organic waste materials, including agricultural wastes, comprising one or more antioxidant components indigenous or native thereto.

It can be another object of the present invention to provide such organic waste and antioxidant components, as-received, without processing to isolate or enhance the antioxidant component, for incorporation into various polymeric compositions.

It can be an object of the present invention, alone or in conjunction with one or more of the preceding objectives, to provide a range of compositions exhibiting enhanced thermal stability relative to a polymer component thereof.

Other objects, features, benefits and advantages of the present invention will be apparent from this summary and the following descriptions of certain embodiments, and will be readily apparent to those skilled in the art having knowledge of thermal-stabilized polymers and methods of preparing such materials. Such objects, features, benefits and advantages will be apparent from the above as taken into conjunction with the accompanying examples, data and all reasonable inferences to be drawn therefrom, alone or with consideration of the references incorporated herein.

In part, the present invention can be directed toward a method of using an organic waste to modulate, improve or otherwise affect the thermal stability of a polymer. Such a method can comprise providing an as-received organic waste component comprising an antioxidant component, and a polymeric resin component; and incorporating one with another. In certain embodiments, such incorporation can comprise applying a mechanical energy to such a mixture through solid-state shear pulverization in the presence of an element of cooling at least partially sufficient to maintain such a mixture in a solid state, such pulverization as can be at least partially sufficient to disperse such an organic component within such a polymeric resin component. In certain other non-limiting embodiments, incorporation can comprise melt-mixing and/or extrusion, optionally in combination with such solid-state pulverization. Regardless, such a method can modulate, improve or otherwise affect the thermal stability of such a resulting polymer composition as compared to such a polymer resin component substantially absent such an organic waste component.

In certain embodiments, such a polymer component can be selected from virgin and recycled (i.e., post-consumer) polymers of the sort discussed below, illustrated herein and as would otherwise be understood by those skilled in the art made aware of this invention. In certain such embodiments, such a polymer component can be a polyethylene or a polypropylene. Regardless, in certain embodiments and irrespective of polymer identity, such an organic component can comprise one or more of the solid waste, refuse and by-products, and combinations thereof, of the sort discussed below, illustrated herein and as would be understood by those skilled in the art made aware of this invention. Without limitation or identity, such an organic component can comprise about 0.1 wt % to about 20.0 wt % or more of such a polymer-organic component mixture. In addition to or instead of solid-state shear pulverization, a polymer-organic waste composition can be melt-processed, injection molded, blow molded, thermoformed, line extruded, or processed or molded as would otherwise be understood by those skilled in the art made aware of this invention. After any such processing and/or molding, such a mixture and/or resulting product can be incorporated into an article of manufacture.

Without limitation, an organic component useful in conjunction with the present invention can be selected from solid organic wastes, post-consumer refuse, agricultural, commercial and manufacturing by-products, and combinations thereof. Such an organic component can be present in an amount sufficient to provide filler, color and/or other functional effect to a resulting polymeric mixture. In certain embodiments, such an organic waste component can be present in an amount up to about 4 wt % . . . about 10 wt % . . . about 15 wt % . . . about 20 wt % . . . or up to about 50 wt % or more of such a polymeric mixture, an amount limited only by type of organic waste, process considerations and/or that needed to effect a particular mechanical or physical property thereof. For instance, without limitation, such organic matter can be selected from grape pomace waste (GW), turmeric shavings and waste (TW), coffee grounds (CG) and citrus peel (e.g., orange) wastes (OW), together with various other organic wastes, refuse and by-products and combinations thereof of the sort understood by those skilled in the art made aware of this invention. Regardless, an organic waste component is limited only by the presence of an antioxidant component therein and thermal stability afforded a resulting polymer-waste composition.

Regardless of organic component identity, a polymer component useful in conjunction with this invention can be selected from but is not limited to polyesters, polyolefins (e.g., high- and low-density polyethylene), polyamides, epoxies, polycarbonates, polyacrylates, polyvinyls (e.g., polyvinyl chlorides), polyethers, polyacrylonitriles, polyacetals, polysiloxanes, polyetherketones, elastomers, polyimides, polyurethanes, polystyrenes, poly(butyleneterephthates), polycaprolactones and poly(ethyleneterephthates), copolymers thereof, combinations of such polymers, combinations of such copolymers, combinations of such polymers and copolymers and combinations of such polymers and/or copolymers with fillers and/or nanofillers, such polymers, copolymers and combinations as can be utilized without compatibilizers of the prior art. Optionally, one or more post-consumer plastic materials, suitably flaked or processed, can be utilized as a polymer component or an adjuvant thereto. Optionally, various other additives can also be incorporated into an organic waste-polymeric resin mixture. Such additives can include but are not limited to fillers and nanofillers (e.g., without limitation, clay, silica, nanoparticles, carbon nanotubes, graphene, graphite, etc. for corresponding polymer composites and nanocomposites) compatiblilizers, lubricants, antistats, impact modifiers, other antioxidants, antimicrobials, light stabilizers, flame retardants, release agents, rheological control agents and combinations thereof, together with one or more other additives of the sort understood and recognized by those skilled in the art made aware of this invention.

While the preceding discussion can be directed to the use of organic waste to modulate, improve and/or otherwise affect the thermal stability of a polymeric resin component, such a method can also be directed to modulate, improve and/or affect one or more polymer mechanical properties (e.g., without limitation, Young's modulus, yield strength and/or elongation at break) and/or physical properties (e.g., without limitation, normalized zero-shear-rate viscosity and/or normalized shear-storage modulus). Regardless, such a method can be accomplished in conjunction with solid-state shear pulverization, melt-mixing, melt extrusion(s) and/or a combination thereof. Such modulation, improvement and/or affect on one or more such properties of such a resulting polymer composition can be realized by comparison to such a polymer resin component substantially absent such an organic waste component.

In part, the present invention can be directed to a composition comprising a polymer component and an organic waste component comprising an antioxidant component, such an organic waste component as can be in an amount sufficient to raise the thermal degradation/percent of mass loss temperature of such a composition relative to such a polymer component. Such a degradation/mass loss temperature is understood by those skilled in the art and discussed more fully elsewhere herein.

Without limitation, such a polymer component can be selected from virgin and recycled (i.e., post-consumer) polymers of the sort discussed below, illustrated herein and/or as would otherwise be understood by those skilled in the art made aware of this invention. Such a polymer component can be selected from but is not limited to polyesters, polyolefins (e.g., high- and low-density polyethylene), polyamides, epoxies, polycarbonates, polyacrylates, polyvinyls (e.g., polyvinyl chlorides), polyethers, polyacrylonitriles, polyacetals, polysiloxanes, polyetherketones, elastomers, polyimides, polyurethanes, polystyrenes, poly(butyleneterephthates), polycaprolactones and poly(ethyleneterephthates), copolymers thereof, combinations of such polymers, combinations of such copolymers, combinations of such polymers and copolymers and combinations of such polymers and/or copolymers with fillers and/or nanofillers, such polymers, copolymers and combinations as can be utilized with or without compatibilizers of the prior art.

Optionally, one or more post-consumer plastic materials, suitably flaked or processed, can be utilized as a polymer component or an adjuvant thereto. Optionally, various other additives can also be incorporated into such a composition. Such additives can include but are not limited to fillers and nanofillers (e.g., without limitation, clay, silica, nanoparticles, carbon nanotubes, graphene, graphite, etc. for corresponding polymer composites and nanocomposites) compatiblilizers, lubricants, antistats, impact modifiers, other antioxidants, antimicrobials, light stabilizers, flame retardants, release agents, rheological control agents and combinations thereof, together with one or more other additives of the sort understood and recognized by those skilled in the art made aware of this invention.

Regardless of polymer component identity, such an organic waste component can be selected from solid organic wastes, post-consumer refuse, agricultural, commercial and manufacturing wastes and by-products, and combinations thereof. Such an organic component can be present in an amount sufficient to provide functional effect to a resulting composition. In certain embodiments, such an organic waste component can be present in an amount up to about 2 wt % . . . about 4 wt % . . . about 10 wt % . . . about 15 wt % . . . about 20 wt % . . . or up to about 50 wt % or more of such a composition, an amount limited only by type of organic waste and/or that needed to affect or modulate a particular mechanical or physical property thereof. For instance, without limitation, such organic matter can be selected from grape pomace waste (GW), turmeric shavings and waste (TW), coffee grounds (CG) and/or citrus peel (e.g., orange) wastes (OW), optionally together with various other organic wastes, refuse and by-products and combinations thereof of the sort understood by those skilled in the art made aware of this invention. With respect to various embodiments of this invention, such an organic waste component is not paper, wood or cardboard. Regardless, an organic waste component is limited only by the presence of an indigenous, native antioxidant component therein and a degree of thermal stability afforded a resulting composition, such thermal stability as can be realized and understood through parameters, mechanical and physical properties and end-use performance properties of the sort discussed herein and illustrated below and/or as would otherwise be understood by those skilled in the art and made aware of this invention.

In a certain non-limiting embodiments, such an organic waste component amount can be about 2 wt % to about 20 wt % of such a composition. In certain such embodiments, grape pomace waste can be about 2.5 wt % to about 4 wt % of such a composition. In certain other such embodiments, turmeric shavings and waste can be about 4 wt % to about 8 wt %. In certain other such embodiments, coffee grounds can be about 4 wt % to about 18 wt %. In yet other such embodiments, citrus peel can be about 4 wt % to about 8 wt %. Regardless, such an organic waste component can be used and incorporated as received without isolation, enhancement and/or promotion of such an antioxidant component.

Regardless of organic waste component identity or amount thereof, such a polymer component can be selected from polyolefins and copolymers thereof. In certain non-limiting embodiments, such a polyolefin can be a polyethylene or a polypropylene.

In part, the present invention can be also directed to a composition comprising a polymer component and an organic waste component comprising an antioxidant component, such an organic waste component as can be in an amount sufficient to increase at least one of Young's modulus and yield strength of such a composition relative to such a polymer component. Such a polymer component can be selected from but is not limited to components of the sort discussed above, illustrated elsewhere herein and/or as would be understood by those skilled in the art made aware of this invention. In certain non-limiting embodiments, such a polymer component can be selected from polyolefins and copolymers thereof. In certain such embodiments, such a polyolefin can be a polyethylene or a polypropylene.

Regardless of polymer component identify, such an organic waste component can be selected from those of the sort discussed above, illustrated elsewhere herein and/or as would be understood by those skilled in the art made aware of this invention. In certain non-limiting embodiments, such an organic waste component can be selected from grape pomace waste, turmeric shavings and waste, coffee grounds and citrus peels and combinations thereof. In certain such embodiments, such an organic waste component amount can be about 4 wt % to about 12 wt % of such a composition. Regardless, such a waste component can be as received without isolation, enhancement and/or promotion of such an antioxidant component.

Accordingly, the present invention can also be in part directed to a composition comprising a polymer component and an organic waste component selected from grape pomace waste, turmeric shavings and waste, coffee grounds and citrus peel and combinations thereof, such an organic waste component comprising an antioxidant component, and such an organic waste component as can be in an amount sufficient to raise the thermal degradation/percent of mass loss temperature of such a composition relative to such a polymer component. Such a polymer component can be of the sort discussed above, illustrated elsewhere herein and/or as would otherwise be understood by those skilled in the art made aware of this invention. In certain non-limiting embodiments, such a polymer component can be selected from polyolefins and copolymers thereof. In certain such embodiments, such a polyolefin can be a polyethylene or a polypropylene.

Regardless of polymer component identity, such an organic waste component amount can be about 2 wt % to about 20 wt % of such a composition. Without limitation, the amount of each such waste component can be as discussed above or illustrated elsewhere herein. Regardless, such an organic waste component can be as received without isolation, enhancement and/or promotion of such an antioxidant component.

In part, the present invention can also be directed to a composition comprising a polymer component and an organic waste component comprising turmeric shavings and waste comprising an antioxidant component, such an organic waste component as can be in an amount sufficient to raise the thermal degradation/percent of mass loss temperature of such a composition relative to such a polymer component. Without limitation, such an organic waste component amount can be about 2 wt % to about 20 wt % of such a composition. Regardless, such a waste component can be as received without isolation, enhancement and/or promotion of such an antioxidant component. Regardless, in certain non-limiting embodiments, such a polymer component can be selected from polyolefins and copolymers thereof. In certain such embodiments, such a polyolefin can be a polyethylene or a polypropylene.

DETAILED DESCRIPTION OF THE DRAWINGS

DETAILED DESCRIPTION OF CERTAIN EMBODIMENTS

In accordance with several nonlimiting embodiments of this invention, hybrids of LDPE were produced with grape waste (skin and seed pomace wastes), turmeric waste (shavings and discards from curry powder manufacturing), spent coffee grounds (from local coffee shops), and orange peel. Such hybrid compositions exhibit substantial improvements in thermo-oxidative stability relative to neat polymer. Because the as-received agro-waste varied in form from relatively fine powders (grape waste and turmeric waste) to centimeter-sized pieces (orange peels), a continuous, solid-state processing method, referred to as solid-state shear pulverization (SSSP) was used to produce hybrids with the four agro-wastes listed above. Alternatively, when the agro-waste is a powder, melt mixing can result in hybrids with significant enhancements in thermo-oxidative stability. As shown in Table 1, agro-waste fillers are available in abundant quantities throughout the year at very low cost of USD $0.10 or less. In contrast, the synthetic antioxidant Irganox™ I1010 costs USD $6.30/kg. The effectiveness of such agro-waste materials as stabilizers was evaluated by thermogravimetric analysis (TGA) and monitoring the evolution of melt viscosity and mechanical properties after multiple extruder passes as may occur with reprocessing associated with recycling. Compared with LDPE with 1 wt % of the synthetic antioxidant Irganox™ I1010, LDPE containing 4-12 wt % agro-based waste exhibits similar or better thermal stability. In addition to their antioxidant activity, well-dispersed agro-waste materials also provide enhancement in some LDPE mechanical properties.

As discussed above, organic waste components useful in conjunction with this invention have indigenous or native thereto one or more antioxidant components. Antioxidants for polymer stabilization can be classified as either primary or secondary antioxidants. Primary antioxidants such as hindered phenols act as radical scavengers. They prevent radical propagation by forming stable peroxy radicals with oxygen and protect the polymer from degradation during the service life of the product. Secondary antioxidants such as sulfur or phosphorous base compounds provide processing stability during melt processing of polymers. They decompose hydroperoxides to form stable alcohols, thus regenerating the primary antioxidants. Agro-based waste residues are often rich in natural phenolic compounds such as lignin, tannins, tocopherols, carotenes, quercetin and flavonoids, which are effective primary antioxidants. In contrast, relatively few naturally existing secondary antioxidants are described in the literature, e.g., cyclodextrins and sulfur-based plant extracts. Waste residues from agricultural and municipal sources such as grape pomace waste, turmeric shavings and waste, coffee grounds, and orange peels often contain complexes of natural phenols and cyclodextrins, making them potentially potent antioxidants in both short- and long-term applications.

As shown in Table 1, many organic waste materials contain hindered phenols. Grape waste contains high concentrations of tocopherols and flavonoids (keto form); both are known for antioxidant activity. Turmeric waste from curry powder manufacturing contains curcumin (1,7-bis(4-hydroxy-3-methoxyphenyl)-1,6-hepadiene-3,5-dione). The natural phenolic structures are responsible for the radical and peroxide scavenging capability of curcumin as well as its metal chelating effect. Similarly, when subjected to high-temperature roasting (190-250° C.), coffee grounds undergo Maillard reactions which generate antioxidants such as melanoidins. Such heat treatment improves antioxidant activities in natural hindered phenols. Al-Malaika et al. reported that the antioxidant activity of α-tocopherol stems partially from its transformation products at melt extrusion temperatures employed for LDPE. Kirschweng et al. observed improved antioxidant activity via improved retention of MFI of LDPE with curcumin incorporation. In a similar vein, high-temperature melt processing of polymers could improve the antioxidant activity of organic waste materials with increasing processing cycles. Therefore, evaluation of organic waste materials as processing and/or long-term thermal stabilizer is made complex by the chemical nature of the antioxidant and also the amount present in them.

TABLE 1

Annual availability, cost and antioxidant activity of natural agro-waste materials

| Agro-Waste | Annual production* in US (thousand tons) | Cost* ($/kg) | Antioxidant* |
|---|---|---|---|
| Grape[1,2] | 100 | 0.05-0.10 | α-tocopherol |
| Turmeric[3] | — | — | Curcumin |
| Coffee grounds[4] | 0.005 | 0.05-0.10 | Melanoidin, Chalcogenic acid |
| Orange peel[5] | 20 | 0.05-0.10 | Ascorbic acid |
| Irganox™ I1010[6] | — | 6.3-6.4 | 4-substituted-2,6-ditertiary butyl phenols |

*Data obtained from ref 1-6.
[1](Larrauri, J. A.; Ruperez, P.; SauraCalixto, F. Effect of Drying Temperature on the Stability of Polyphenols and Antioxidant Activity of Red Grape Pomace Peels. *J. Agric. Food Chem.* 1997, 45, 1390-1393);
[2](Winemaking Waste Could Become Biofuel Starter);
[3](Kumar, G. S.; Nayaka, H.; Dharmesh, S. M.; Salimath, P. V. Free and bound phenolic antioxidants in amla (*Emblica officinalis*) and turmeric (*Curcuma longa*). *J. Food Compos. Anal.* 2006, 19, 446-452);
[4](Panusa, A.; Zuorro, A.; Lavecchia, R.; Marrosu, G.; Petrucci, R. Recovery of Natural Antioxidants from Spent Coffee Grounds. *J. Agric. Food Chem.* 2013, 61, 4162-4168);
[5](Zhou, W.; Widmer, W.; Grohmann, K. Economic Analysis of Ethanol Production from Citrus Peel Waste. *Proc. Fla. State Hort. Soc.* 2007, 120, 310-315);
[6](Irganox™ I1010. Specification sheet).

Figure 1A:
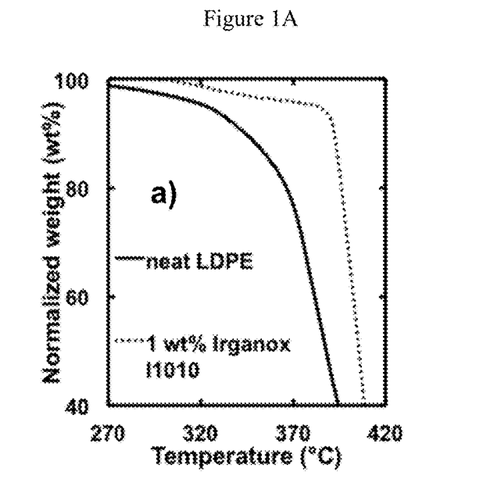
FIGS. 1A-D. Thermal degradation behavior in air of neat LDPE and LDPE hybrids with A) Irganox™ I1010, B) GW (grape waste), C) TW (turmeric waste), and D) CG (coffee grounds).
Figure 1B:
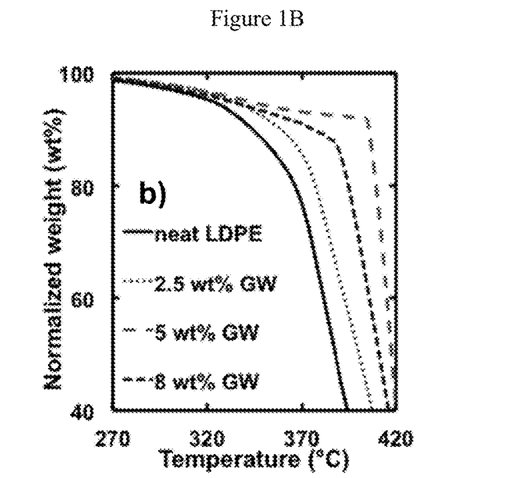

Grape waste (GW), turmeric waste (TW), coffee grounds (CG), and orange peel waste (OW) were investigated as long-term antioxidants for LDPE. Thermogravimetric analysis in air was used to compare the effectiveness of natural antioxidants with that of the synthetic antioxidant Irganox™ I1010 in stabilizing polymer against thermo-oxidative degradation under quiescent conditions. FIGS. 1A-D shows thermograms of LDPE samples incorporating 1 wt % Irganox™ I1010 (a common loading level in commercial application) added by melt processing or various loadings of agro-waste incorporated in LDPE via SSSP. Degradation temperatures corresponding to 10 and 20% mass loss are designated as $T_{10\%}$ and $T_{20\%}$, respectively. Neat LDPE is susceptible to oxidative degradation showing $T_{10\%}$ and $T_{20\%}$ values of 344 and 366° C., respectively. As shown in FIG. 1A, incorporation of 1 wt % Irganox™ I1010 in LDPE results in 48° C. and 30° C. increases in $T_{10\%}$ and $T_{20\%}$, respectively.

Effective incorporation of agro-waste materials into LDPE via SSSP leads to major stability enhancements. Use of 2.5 wt % GW as filler in LDPE resulted in 15° C. elevations in both $T_{10\%}$ and $T_{20\%}$ (see FIG. 1B). Increasing the GW loading to 4 wt % produced hybrids with the best stability enhancement, with 62 and 44° C. increases in $T_{10\%}$ and $T_{20\%}$, respectively, relative to neat LDPE. These enhancements are far superior to those observed with 1 wt % I1010.

Note that SSSP is not the only process that can be used to produce LDPE/agro-waste hybrids with enhanced thermo-oxidative stability relative to neat polymer. When the as-received agro-waste is in the form of a relatively fine powder, as in the case of GW or TW in the present study, it is possible to mix the filler effectively in the polymer with appropriately intense melt mixing in order to achieve enhanced thermal stability. A comparison of thermograms for 96/4 wt % LDPE/GW hybrids made by melt mixing (using a MiniMax molder as a 4-gram-scale surrogate for a batch intensive mixer) and by SSSP reveals that melt mixing results in a 36° C. increase in $T_{20\%}$ relative to neat LDPE, close to the 44° C. increase achieved when SSSP is used to make the hybrid. (See FIG. 1E.) Of course, in other circumstances when the as-received filler is not a relatively fine powder, e.g., dry coffee grounds or orange peels, other solid-state processing methods may be appropriate, including ball milling. Grinding operations may also be employed to achieve size reduction, thereby making agro-waste more amenable to mixing with polymer by non-SSSP based methods.

Figure 1C:
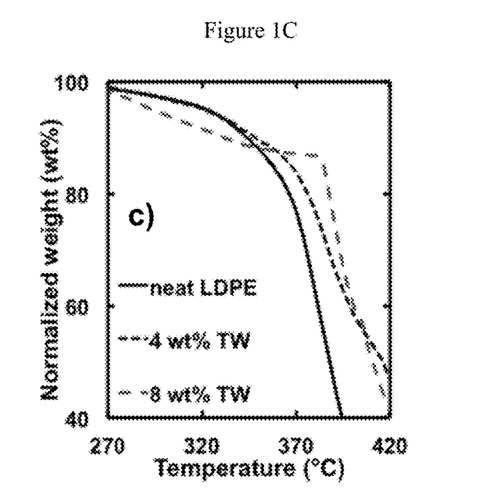
Figure 1D:
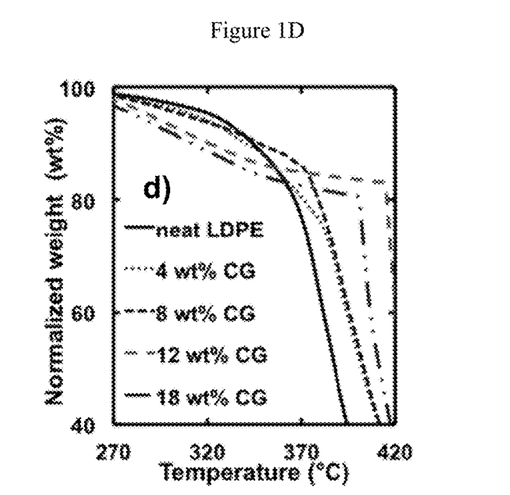
Figure 1E:
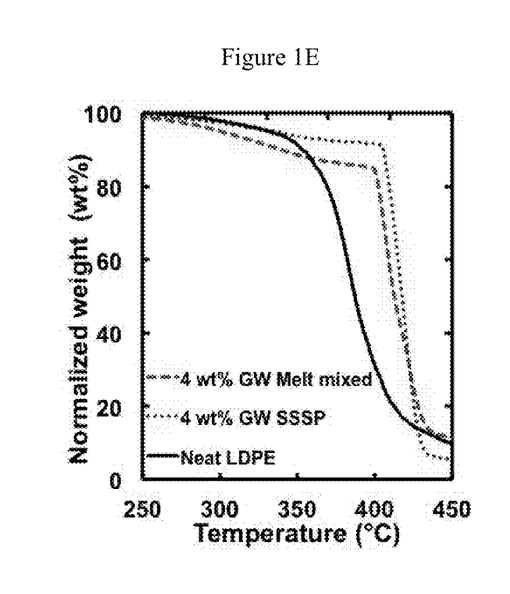
FIG. 1E. Thermal degradation behavior in air of neat LDPE and LDPE hybrids with 4 wt % grape waste prepared via SSSP and melt mixing.
Figure 2A:
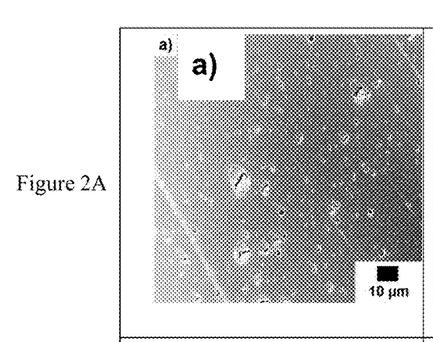
FIGS. 2A-D. Field-emission scanning electron micrographs of LDPE hybrids with A) 4 wt % grape waste, B) 8 wt % turmeric waste, C) 12 wt % coffee grounds, and D) 8 wt % orange peel waste.
Figure 2B:
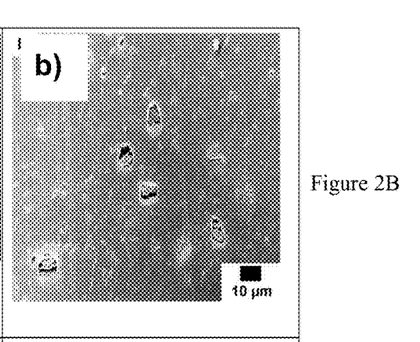
Figure 2C:
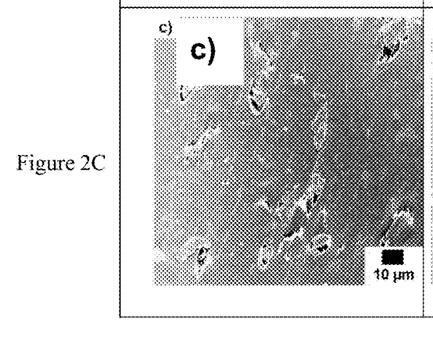
Figure 2D:
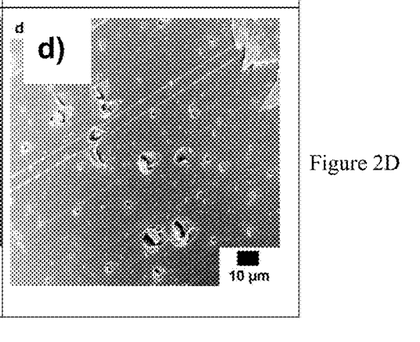

In addition to antioxidants, natural agro-wastes from coffee making, fruit and curry powder processing often contain other organic materials such as cellulose, which have relatively low thermal stability. For example, TW (skin and flesh) contains low thermal stability materials like hemicellulose. FIG. 1C shows that incorporating 8 wt % TW results $T_{10\%}$=332° C. which is lower than that of neat LDPE. This reduction in $T_{10\%}$ could be caused at least in part by low thermal stability fractions in TW, low molecular weight Maillard reaction by-products or other transformation products. Following the initial weight loss, the presence of curcumin in TW increases $T_{20\%}$ to 388° C., 22° C. higher than neat LDPE. Similarly, incorporation of increasing amounts of CG results in improved thermal stability at 20% mass loss, with a sample containing 12 wt % CG showing a 49° C. increase in $T_{20\%}$ relative to neat LDPE (see FIG. 1D) and a 19° C. increase compared to LDPE containing 1 wt % Irganox™ I1010. Similar results are obtained with effective incorporation of OW into LDPE (see FIG. 1E).

Contrary to initial observation, reductions of $T_{10\%}$ observed with the addition of certain natural waste do not necessarily indicate inferior antioxidant potency, as the heat treatment steps during melt processing of the hybrid can indeed improve antioxidant activity of these waste materials. (As discussed elsewhere herein, SSSP is performed under near-ambient temperature conditions with polymers in their solid state. Further, all fillers used in the current study are incorporated as-received without extraction, size reduction or drying.) Samples that demonstrated maximum stability enhancements based on $T_{20\%}$ were chosen for further characterization of filler dispersion, mechanical robustness and recyclability.

Based on TGA results, samples of LDPE containing 4 wt % GW, 8 wt % TW, 12 wt % CG or 8 wt % OW have yielded substantial improvements in $T_{20\%}$ values relative to neat LDPE. In order for such fillers to show effectiveness in stabilizing the polymer matrix against thermo-oxidative degradation, they must undergo effective size reduction and dispersion. As shown in FIGS. 2A-D, SSSP processing used to make these LDPE/agro-based hybrids yields excellent particle size reduction and relatively homogenous filler dispersion. For example, centimeter-sized OW prior to SSSP is reduced to size scales of less than ten microns within the LDPE matrix after SSSP. All four agro-waste fillers considered here are seemingly wetted into the polymer matrix despite the lack of favorable interfacial interactions, with the exception of van der Waals interactions, between the hydrophilic filler and the hydrophobic matrix.

Table 2 summarizes the mechanical properties of LDPE/agro-waste residue prepared by SSSP. The excellent dispersion of organic waste fillers achieved by SSSP results in enhancements in Young's modulus. For example, relative to neat LDPE, incorporation of 4 wt % GW leads to a 22% increase in modulus, whereas incorporating 8 wt % TW leads to a 35% increase. Similarly, incorporating 12 wt % CG and 8 wt % OW produces 16 and 30% increases in modulus, respectively. In addition, all hybrids investigated here exhibited yield strengths that are within error identical to or better than that of neat LDPE.

TABLE 2

Mechanical properties of LDPE hybrids before extrusion

| Sample | Young's modulus (MPa) | Yield strength (MPa) | Elongation at break (%) |
|---|---|---|---|
| neat LDPE | 155 ± 5 | 10.0 ± 0.3 | 500 ± 30 |
| 99/1 wt % LDPE/I1010 | 160 ± 10 | 10.2 ± 1.0 | 510 ± 20 |
| 96/4 wt % LDPE/GW | 190 ± 15 | 10.5 ± 0.8 | 330 ± 40 |
| 92/8 wt % LDPE/TW | 210 ± 15 | 12.3 ± 1.1 | 410 ± 40 |
| 88/12 wt % LDPE/CG | 180 ± 15 | 10.6 ± 1.0 | 400 ± 30 |
| 92/8 wt % LDPE/OW | 201 ± 10 | 10.6 ± 0.9 | 335 ± 30 |

Incorporating well-dispersed waste filler results in minor reductions in elongation at break, e.g., 96/4 wt % LDPE/GW has an elongation at break of 330% compared to 500% for neat LDPE. Incorporation of other organic wastes such as CG and TW leads to greater retention of elongation at break values with composites showing 400 and 410% elongation, respectively. Therefore, effective incorporation of natural waste as antioxidant enhances neat LDPE modulus and maintains neat LDPE yield strength with a relatively small reduction in elongation at break.

Through thermogravimetric analysis, FIGS. 3A-D show changes in the antioxidant behavior of Irganox™ I1010 and natural antioxidants after reprocessing, i.e., multiple extrusion passes at a die temperature of 180° C. Such characterization is key because if natural compounds are to be employed as antioxidants for polymers, then it will be important that some antioxidant activity is retained with multiple reprocessing or recycling operations.

Figure 3A:
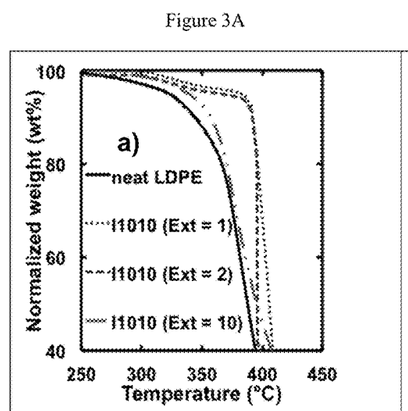
FIGS. 3A-D. Thermal degradation behavior in air of LDPE hybrids with A) 1 wt % Irganox™ I1010, B) 4 wt % grape waste, C) 8 wt % turmeric waste, D) 12 wt % coffee grounds before and after multiple extrusion cycles. (Note. Irganox™ I1010 was incorporated in LDPE via melt extrusion.)

As shown in FIG. 3A, incorporation of 1 wt % Irganox™ I1010 in LDPE offers excellent thermal stability enhancements for up to two extrusion cycles with 48 and 30° C. increase in $T_{10\%}$ and $T_{20\%}$, respectively, relative to neat LDPE (subjected to no extrusion). Multiple extrusion cycles at high temperatures performed in the current study simulate recycling or accelerated aging under normal use conditions. Under these circumstances, antioxidant effectiveness may deteriorate due to either full consumption or loss by migration (evaporation) during reprocessing. Therefore, after six extruder passes of LDPE with 1 wt % Irganox™ I1010, we observed only 11 and 4° C. increases in $T_{10\%}$ and $T_{20\%}$, respectively, compared to neat LDPE.

Among the materials under examination, the sample exhibiting the best antioxidant activity during multiple processing cycles contained 8 wt % TW. As shown in FIG. 3C, before extrusion, 92/8 wt % LDPE/TW exhibits a 10° C. decrease in $T_{10\%}$ and a 22° C. increase in $T_{20\%}$ relative to neat LDPE. After two extrusion passes, it shows dramatic 40° C. increases in both $T_{10\%}$ and $T_{20\%}$ relative to neat LDPE. Further extrusion passes lead to an increase in $T_{10\%}$ by 52° C. and $T_{20\%}$ by 36° C. relative to neat LDPE. Such major enhancement in the antioxidant activity after multiple extrusion steps is indicative of side reactions that produce additional antioxidants at elevated temperature.

Figure 3B:
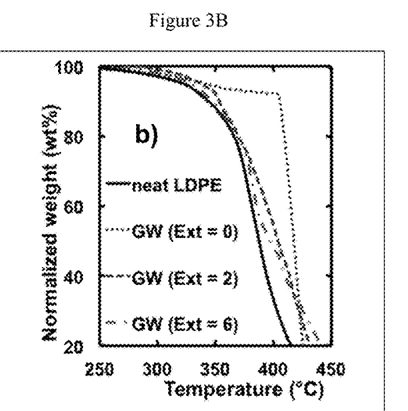
Figure 3C:
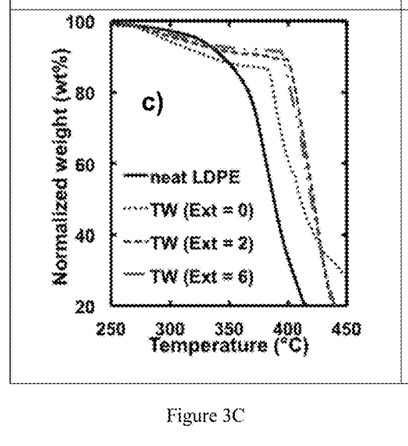
Figure 3D:
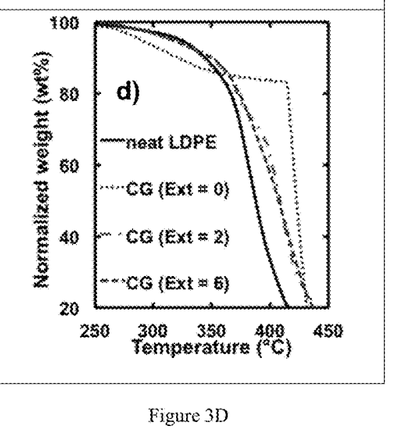
Figure 3E:
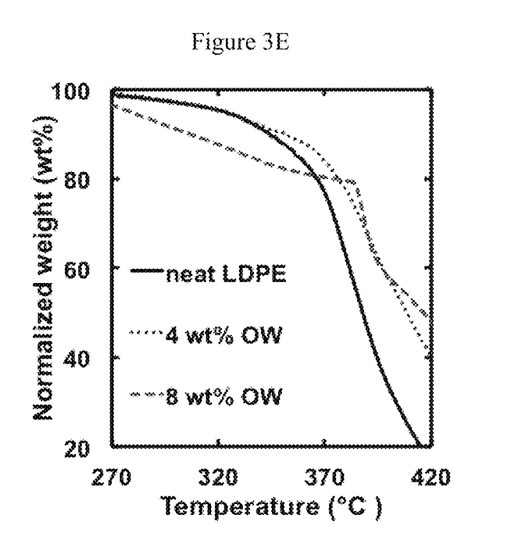
FIG. 3E. Thermal degradation behavior in air of neat LDPE and LDPE hybrids with orange peel waste (OW).
Figure 3F:
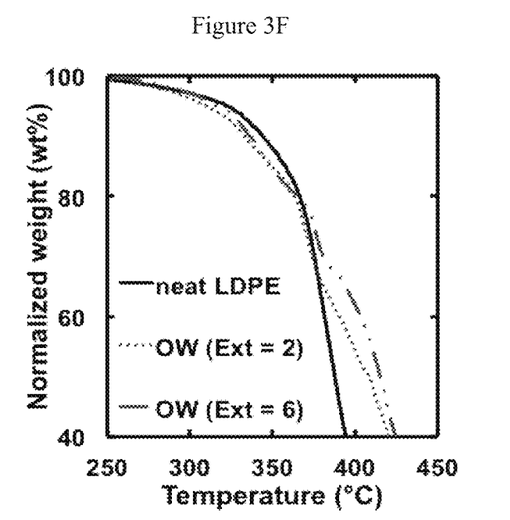
FIG. 3F. Thermal degradation behavior in air of LDPE hybrids with 8 wt % orange peel waste after multiple extrusion cycles.

On the other hand, relative to neat LDPE, two extrusion passes at 180° C. for 96/4 wt % LDPE/GW result in mild increases in $T_{10\%}$ and $T_{20\%}$ of 11 and 4° C., respectively (FIG. 3B). Importantly, after six extrusion passes, the composites with GW still show ~3° C. increases in $T_{10\%}$ and $T_{20\%}$ (FIG. 3D). In a similar vein, incorporation of 12 wt % CG as thermal stabilizer produces a slight 4-6° C. increase in $T_{10\%}$ and $T_{20\%}$ relative to neat LDPE after multiple extrusions. By way of further comparison, incorporation of 8 wt % OW results in $T_{10\%}$ and $T_{20\%}$ that are within error similar to that of neat LDPE. (See FIGS. 3E-F.)

A couple of observations can be made from these results. First, all LDPE hybrids incorporating the natural waste materials (at given incorporation levels) studied here possess antioxidant potency, either processing stability or long-term stability, that is similar or superior to that of 1 wt % Irganox™ I1010. Second, natural waste materials such as GW, CG and OW, which contain hindered phenols like α-tocopherols or chlorogenic acids, offer improved processing stability to the polymer, whereas TW rich in curcumin provides recyclability (long-term stability) indicated by the enhanced antioxidant activity after multiple extrusion steps.

Polymer degradation is a function of time, temperature, and external stressed applied to the material during use/processing. Degradation of LDPE during high-temperature melt processing may begin at susceptible links along the polymer chain, such as peroxide, carbonyl, chain branch and unsaturated structural and functional groups. Primary alkyl radicals from random chain scission react with vinyl chain ends to produce secondary alkyl radicals, which can combine with primary radicals and lead to long chain branching as well as crosslinking. Chain scission can also lead to molecular weight reduction.

Figure 4A:
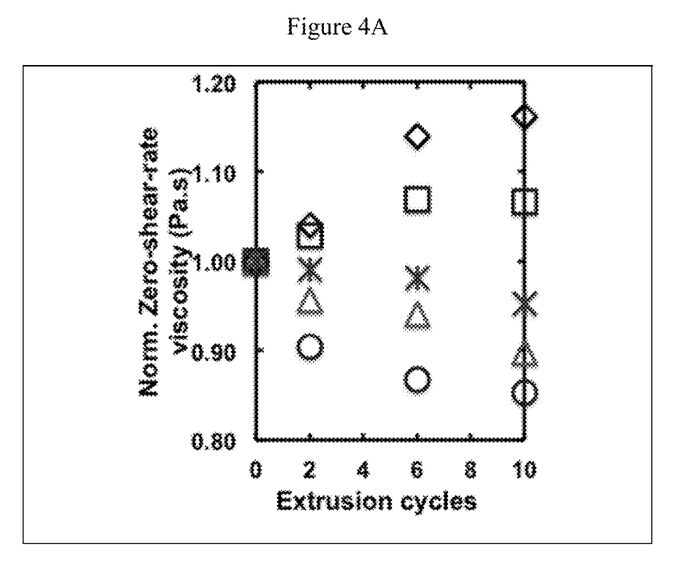
FIG. 4A. Dependence of normalized zero-shear viscosity measured at 140° C. on the number of extrusion cycles for neat LDPE (diamond) and LDPE hybrids with 8 wt % TW (turmeric waste; square), 12 wt % CG (coffee grounds; asterisk), 1 wt % Irganox™ I1010 (triangle) and 4 wt % GW (grape waste; circle).

FIG. 4A shows the impact of reprocessing (multiple extrusions at 180° C. die temperature) on the zero-shear-rate viscosity (at 140° C.) of LDPE and LDPE hybrids. The neat LDPE control shows an increase in normalized shear storage modules, $\eta_o$, after multiple extrusion passes, with a 16% increase accompanying ten extrusion cycles. Such increases indicate structural changes due to degradation leading to long chain branching. In contrast, incorporation of 1 wt % Irganox™ I1010 results in an 11% decrease in $\eta_o$ after ten extrusion passes which indicates that degradation in the presence of this synthetic antioxidant leads to small levels of chain scission.

Figure 4B:
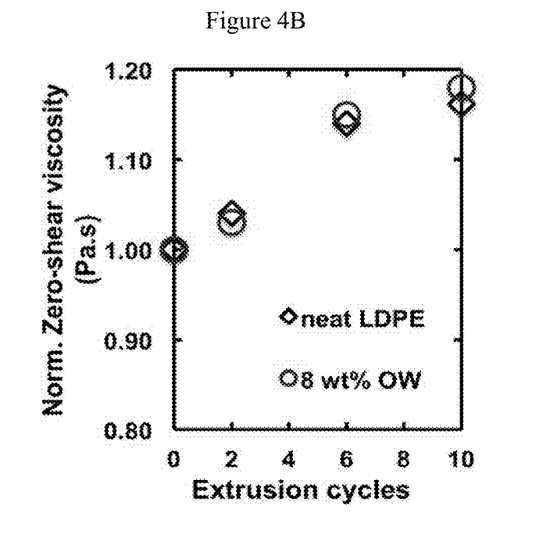
FIG. 4B. Dependence of normalized zero-shear viscosity measured at 140° C. on the number of extrusion cycles for neat LDPE (diamond) and LDPE hybrid with 8 wt % OW (orange peel waste; circle).

Natural antioxidants based on organic waste materials provide melt stability to LDPE that is comparable or superior to that achieved by Irganox™ I1010. For instance, after ten extrusion passes, LDPE incorporating 8 wt % TW exhibits a 6% increase in $\eta_o$, LDPE incorporating 12 wt % CG leads to only a 4.5% decrease in $\eta_o$, and LDPE incorporating 4 wt % GW exhibits a 14% reduction in $\eta_o$, only slightly greater in magnitude than that observed with LDPE incorporating 1 wt % Irganox™ I1010 as thermal stabilizer. (On the other hand, LDPE with 8 wt % OW on shows an increase in normalized $\eta_o$ after ten extrusion passes that is similar to that of LDPE. See FIG. 4B.) Related observations have been reported by Al-Malaika et al. who demonstrated the melt stabilization achieved by incorporating α-tocopherols in LDPE. After four extrusion passes at 180° C., incorporation of only 0.2 wt % α-tocopherol resulted in a minor 2.5% decrease in MFI compared to 6% and 20% decreases seen with 0.2 wt % I1010 and neat LDPE, respectively. After six extrusion passes, Kirschweng et al. observed a 6% increase in MFI relative to neat LDPE incorporating 1000 ppm curcumin, consistent with the results shown here with TW. The very small changes in MFI observed with natural antioxidant filler in purified form or in $\eta_o$ observed in the current study with as-received, unpurified agro-waste filler that contains natural antioxidants indicate that long-term stabilization after multiple recycling steps offered by natural antioxidants can be as effective as that obtained with synthetic antioxidants.

Figure 5A:
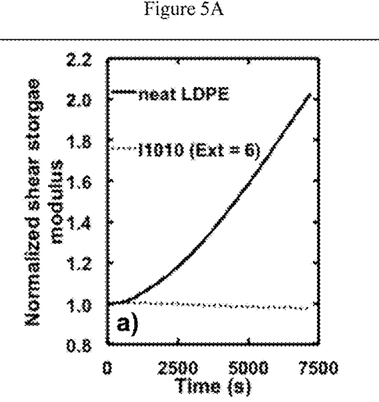
FIGS. 5A-D. Evolution of normalized shear storage modulus for neat LDPE and LDPE hybrids as a function of time under oscillatory shear at 200° C.: A) 1 wt % Irganox™ I1010, B) 4 wt % grape waste, C) 8 wt % turmeric waste, and D) 12 wt % coffee grounds.

Oxidative degradation of polymers can be accelerated due to external forces and stresses. Isothermal, shear flow experiments offer greater insights into the efficacy of natural antioxidants in providing stabilization during melt processing. Low amplitude oscillatory shear (LAOS) measurements at a constant frequency (and hence shear rate) were used to monitor time-dependent microstructural changes during melt flow. FIGS. 5A-D shows the normalized shear storage modulus (G') for LDPE and LDPE hybrids measured at 200° C. as a function of time. (Values of storage modulus are normalized by their respective values at the start of flow.) As shown in FIG. 5A, neat LDPE undergoes a major increase in G' beginning at ~500 s due to chain branching. Despite TGA results showing some deterioration in antioxidant efficacy of 1 wt % Irganox™ I1010 in LDPE with multiple extrusions, LAOS measurements demonstrate that it retained antioxidant activity even after six extrusions: normalized G' of LDPE with 1 wt % Irganox™ I1010 remains nearly invariant with flow time up to more than 7000 s.

Figure 5B:
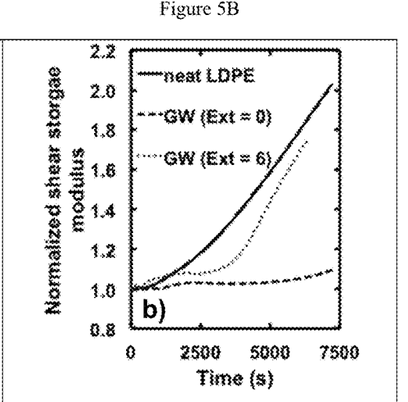
Figure 5C:
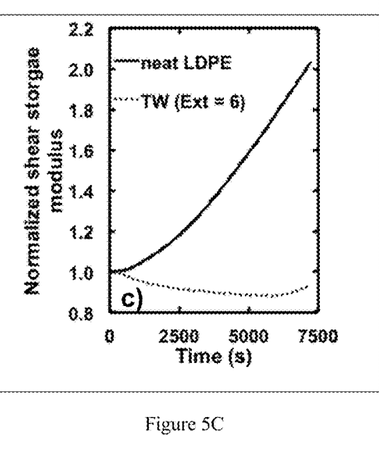
Figure 5D:
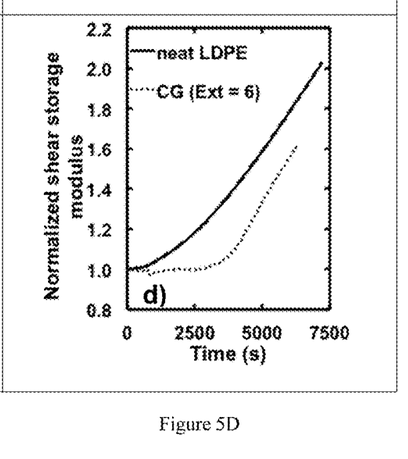
Figure 5E:
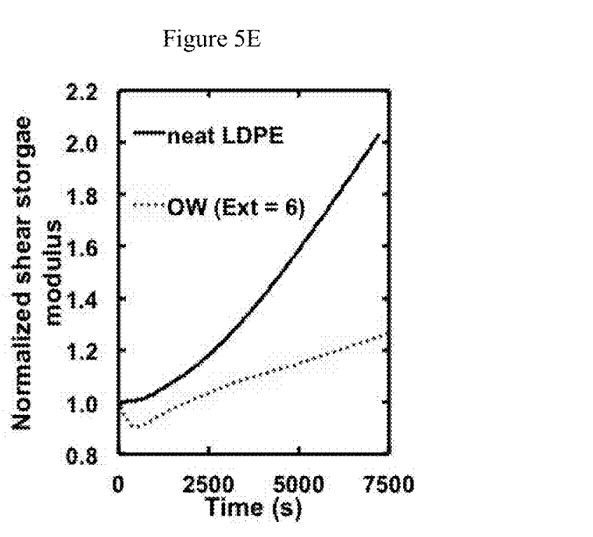
FIG. 5E. Evolution of normalized shear storage modulus for neat LDPE and 92/8 wt % LDPE/OW hybrid as a function of time under oscillatory shear at 200° C.

FIG. 5B compares the antioxidant effectiveness of 4 wt % GW in stabilizing LDPE melt before extrusion and after six extrusion passes. The sample without extrusion exhibits a nearly constant G' value for more than 5000 s. Subjecting the composite to multiple extrusion passes results in decreased antioxidant activity, as indicated by increasing G' values after ~3000 s. FIG. 5C demonstrates that addition of 8 wt % TW to LDPE leads to melt stabilization after six extrusion passes is nearly as good as that of Irganox™ I1010. Only slightly inferior results are obtained with LDPE samples incorporating 12 wt % CG (FIG. 5D) or 8 wt % OW (FIG. 5E) which show no change in G' for flow times up to ~3300-4000 s.

These measurements add further evidence that natural antioxidants from agro-waste show substantial antioxidant activity after multiple reprocessing cycles. In particular, melt stabilization of LDPE provided by 8 wt % TW virtually matches that obtained with 1 wt % of the synthetic antioxidant Irganox™ I1010. Thus, in addition to long-term stability, natural antioxidants can also provide processing stability during recycling of LDPE-based hybrids.

Figure 6:
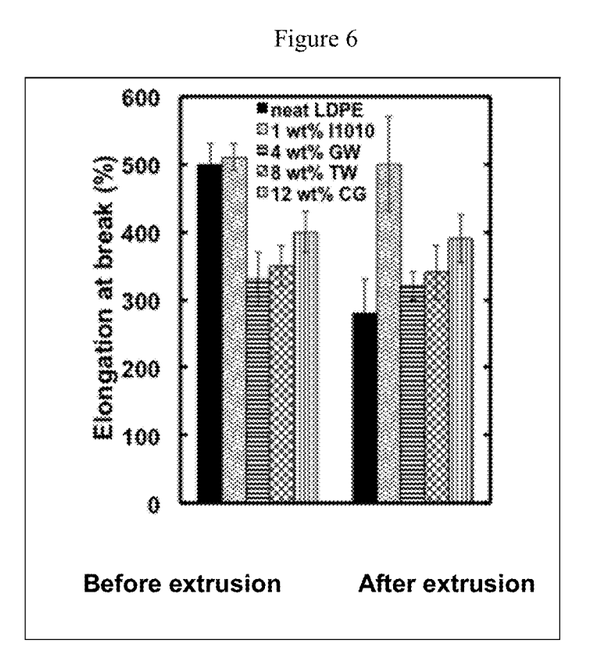
FIG. 6. Elongation at break of LDPE and LDPE/antioxidant hybrids before extrusion and after 10 extrusion cycles containing I1010, 4 wt % grape waste, 8 wt % turmeric waste, and 12 wt % coffee grounds.

Among other materials properties, elongation at break and toughness are highly sensitive to degradation. Degradation that leads to molecular weight reduction, crosslinking and branching can significantly reduce elongation at break. As seen in FIG. 6, elongation at break for neat LDPE decreases from 500% (before extrusion) to 280% after ten extrusion passes. Such reduction in elongation at break indicates significant degradation during multiple extrusion steps. Incorporating 1 wt % Irganox™ I1010 in LDPE leads to retention of elongation at break similar to that (but with enhanced sample-to-sample variability) of neat LDPE after ten extrusion passes.

The large shear stresses imparted by SSSP processing to the LDPE/agro-waste hybrids lead to homogenous dispersion of agro-waste residues with the resulting LDPE hybrids exhibiting relatively small reductions in elongation at break relative to neat LDPE. Interestingly, as shown in FIG. 6, after ten extrusion passes the LDPE hybrids incorporating antioxidant rich agro-wastes considered here exhibit the same elongation at break values as before any exposure to extrusion. Furthermore, the elongation at break values for the LDPE/agro-waste hybrids after ten extrusion cycles are equal to or better than that of neat LDPE after ten extrusion cycles. Thus, analogous to Irganox™ I1010, incorporation of antioxidant-rich waste materials stabilizes LDPE against scission during the repeated processing steps resulting in the original elongation at break.

EXAMPLES OF THE INVENTION

The following non-limiting examples and data illustrate various aspects and features relating to the compositions and/or methods of the present invention, including the use of various organic wastes comprising antioxidant components therein. In comparison with the prior art, the present compositions provide results and data which are surprising, unexpected and contrary thereto. While the utility of this invention is illustrated through the use of several compositions and polymer, organic waste and antioxidant components which can be incorporated therein, it will be understood by those skilled in the art that comparable results are obtainable with various other compositions and polymer, organic waste and antioxidant components, as are commensurate with the scope of this invention.

Materials. Low density polyethylene (ExxonMobil, density=0.919 g/cm$^3$, and MFI=1.1 g/10 min) and Irganox™ I1010 (Ciba Specialty Chemicals) were used as received. Grape pomace waste (seed and skin waste from winemaking) was obtained from ApresVin (Washington State, USA). Turmeric waste (from local curry powder manufacturing units, India), orange peel waste (obtained locally) and room-temperature-equilibrated coffee grounds (obtained locally) were used as received.

Example 1

Preparation of green hybrids of LDPE/agro-waste residue. The LDPE pellets and agro-wastes were co-fed into a pilot-plant/research-scale Berstorff ZE-25 pulverizer with a K-tron S-60 feeder at a feed rate of ~100 g/h. The pulverizer barrels were cooled by a recirculating ethylene glycol/water mix (-7° C., Budzar Industries WC-3 chiller) in order to maintain the semi-crystalline (solid) state of the LDPE. The materials were processed via SSSP at high specific energy input and a 200 rpm screw speed. A sample of 96/4 wt % LDPE/grape pomace waste was also made using an ATLAS Electronic Devices MiniMax molder (cup-and-rotor mixer) and with three small steel balls included in the cup to achieve chaotic mixing; processing was done in the melt state at 140° C. and a rotor speed of 160 rpm. For comparison, a sample of LDPE with 1 wt % Irganox™ I1010 was prepared by melt processing at 140° C. using a Randcastle RCP-0625 microtruder. (Irganox™ I1010 was incorporated via melt mixing to draw better comparison with industrial mixing of polyolefins with synthetic antioxidants.)

Additional detail regarding an SSSP apparatus and associated processing conditions, as would be known to and understood by those skilled in the art and made aware of this invention, can be found in the literature. (See, e.g., Iyer, K. A.; Torkelson, J. M. Sustainable green hybrids of polyolefins and lignin yield major improvements in mechanical properties when prepared via solid-state shear pulverization. *ACS Sustain. Chem. Eng.* 2015, 3, 959-968; Iyer, K. A.; Torkelson, J. M. Green composites of polypropylene and eggshell: Effective biofiller size reduction and dispersion by single-step processing with solid-state shear pulverization. *Compos. Sci. Technol.* 2014, 102, 152-160; Iyer, K. A.; Torkelson, J. M. Dispersion and property enhancements in polyolefin/soy flour biocomposites prepared via melt extrusion followed by solid-state shear pulverization. *Macromol. Mater. Eng.* 2015, DOI: 10.1002/mame.201500019; Iyer, K. A.; Schueneman, G. T.; Torkelson, J. M. Cellulose nanocrystal/polyolefin biocomposites prepared by solid-state shear pulverization: Superior dispersion leading to synergistic property enhancements. *Polymer* 2015, 56, 464-475; Iyer, K. A.; Torkelson, J. M. Novel, synergistic composites of polypropylene and rice husk ash: Sustainable resource hybrids prepared by solid-state shear pulverization. *Polym. Compos.* 2013, 34, 1211-1221; Brunner, P. J.; Clark, J. T.;

Torkelson, J. M.; Wakabayashi, K. Processing-Structure-Property Relationships in Solid-State Shear Pulverization: Parametric Study of Specific Energy. *Polym. Eng. Sci.* 2012, 52, 1555-1564.)

Benefits available from an SSSP apparatus employed in conjunction with the present methodologies relate to the ability to cool the barrel below room temperature and the use of tri lobe rather than bi lobe screw elements along a portion of the pulverizer screw. Details regarding SSSP processes and equipment (e.g., component construction, screw elements, transport elements, kneading or shearing elements, and spacer elements and/or the sequence or design thereof selected or varied as required to accommodate a polymer starting material, pulverization parameters and/or a resulting pulverized polymer product) are known to those skilled in the art made aware of this invention. (See, e.g., Furgiuele, N.; Lebovitz, A. H.; Khait, K.; Torkelson, J. M. Macromolecules 2000, 33, 225 228; Furgiuele, N.; Lebovitz, A. H.; Khait, K.; Torkelson, J. M. Polym Eng. Sci 2000, 40, 1447 1457; Lebovitz, A. H.; Khait, K.; Torkelson, J. M. Macromolecules 2002, 35, 8672 8675; Kasimatis, K. G.; Torkelson, J. M. PMSE Prepr 2005, 92, 255 256; Tao, Y.; Kim, J.; Torkelson, J. M. Polymer 2006, 47, 6773 6781; Walker, A. M.; Tao, Y.; Torkelson, J. M. Polymer 2001, 48, 1066 1074; Lebovitz, A. H.; Khait, K.; Torkelson, J. M. Polymer 2003 44, 199 206; and U.S. Pat. Nos. 5,814,673; 6,180,685; and 7,223,359—each of which is incorporated herein by reference in its entirety.)

Example 2

Melt processing and assessment of melt stability. Polymer samples containing agro-waste (SSSP-processed) or synthetic antioxidant (melt-processed) were melt-extruded at 50 rpm using a Randcastle RCP-0625 microtruder (screw diameter=0.625 in, length/diameter=24). The three barrel zones were maintained at 140, 150 and 170° C. and the die head at 180° C. The polymer melt was cooled and pelletized. Samples of the polymer pellets were re-extruded at the same conditions up to ten extrusion cycles and were collected after second, sixth, and tenth passes. Those materials were hot pressed into discs using a PHI press (Model 0230 C-X1) at 140° C. for 5 min with 5 ton ram force. The magnitude of complex viscosity ($|\eta^*(\omega)|$) as a function of frequency ($\omega$) from 0.01 to 100 s$^{-1}$ was determined via small-amplitude oscillatory shear measurements (TA Instruments ARES rheometer with a 25 mm parallel plate fixture). Zero-shear-rate viscosity of samples was obtained by fitting the experimental data to Cross model:

$$|\eta^*(\omega)|=\eta_o/[1+(\lambda\omega)^n] \quad (1)$$

where $\eta_o$ is the zero-shear-rate viscosity associated with the Newtonian plateau, $\lambda$ is the characteristic relaxation time, $\omega$ is frequency, and n is the shear thinning index. (See, Cross, M. M. Rheology of non-Newtonian fluids: A new flow equation for pseudoplastic systems. *J. Colloid Sci.* 1965, 20, 417-437.) To further characterize the effectiveness of antioxidants in stabilizing the polymer melt, the dynamic shear storage modulus (G') was monitored as a function of time at 200° C. and a shear rate of 10 s$^{-1}$. Thermo-oxidative degradation was also examined by thermogravimetric analysis (TGA, Mettler Toledo 851e) under air. Samples weighing ~5 mg were heated to 700° C. at 10° C./min.

Example 3

Morphological and mechanical characterization. Field-emission scanning electron microscopy (FE-SEM) samples were prepared by melting and extruding the hybrids with a MiniMax molder. Morphologies of cryo-fractured sections of the composites were obtained via a Hitachi SU8030 instrument after sputter coating (Denton Desk III) with gold. Uniaxial tensile test samples before and after extrusion were prepared by hot pressing at 140° C. for 5 min using a 5 ton ram force. Dog-bone shaped specimens were cut from films of ~0.7 mm thickness using a Dewes-Gumbs die and tested with an MTS Sintech 2S tensile tester (ASTM D1708) with a 5 kN load cell and a crosshead speed of 50 mm/min.

As demonstrated, the direct use of antioxidant-rich agro-waste materials provides thermo-oxidative stabilizers for LDPE without the need for chemical treatment or extraction. The TGA results showed that incorporating 4 wt % GW in LDPE produced 62 and 44° C. increases in $T_{10\%}$ and $T_{20\%}$ relative to neat LDPE, respectively, and 14° C. increases in both $T_{10\%}$ and $T_{20\%}$ compared to 1 wt % I1010. Large enhancements in thermal stability relative to neat LDPE were also observed in hybrids with 8 wt % TW (22° C. increase in $T_{20}\%$) and 12 wt % CG (49° C. increase in $T_{20}\%$). The FE-SEM images showed the very good size reduction and dispersion of as-received agro-waste within the LDPE matrix achieved by SSSP. Incorporating well dispersed agro-waste in LDPE also led to improvement in Young's modulus: 22% increase with 4 wt % GW, 35% increase with 8 wt % TW, and 16% increase with 12 wt % CG compared to neat LDPE. Relative to neat LDPE, all hybrids exhibited yield strength values that were equal to or better than that of neat LDPE and relatively small reductions in elongation at break. In some cases, reprocessing or recycling of hybrids led to enhanced antioxidant activity that is superior to that seen with Irganox™ I1010. For example, after six extrusion passes, 92/8 wt % LDPE/TW showed a 41 and 32° C. increases in $T_{10\%}$ and $T_{20\%}$, respectively, relative to 99/1 wt % LDPE/I1010. These results indicate the formation of transformation products during multiple heating steps/extrusion cycles that enhance the thermal stability of the hybrids.

Besides mass loss, degradation associated with polymer molecular weight reduction and chain branching was characterized by melt rheology. Neat LDPE exhibited a 16% increase in zero-shear-rate viscosity and a significant reduction in elongation at break after ten melt extrusion cycles as a result of accompanying chain scission and branching. Incorporating natural antioxidants led to good retention of both zero-shear-rate viscosity and elongation at break values after ten extrusions. Isothermal shear flow measurements corroborated these results. After six extrusion cycles, LDPE hybrids with GW, TW or CG exhibited unchanged shear modulus for more than 3000 s in comparison to neat LDPE which showed dramatic increases after ~500 s.

We claim:

1. A composition comprising a polymer matrix component and an organic waste component dimensioned less than about 10 microns and dispersed in said matrix component, said waste component comprising an antioxidant component, said organic waste component in an amount sufficient to raise the thermal degradation/percent of mass loss temperature of said composition relative to said polymer component.

2. The composition of claim 1 wherein said organic waste component is selected from grape pomace waste, turmeric shavings and waste, coffee grounds and citrus peel and combinations thereof.

3. The composition of claim 2 wherein said organic waste component amount is about 2 wt % to about 20 wt % of said composition.

4. The composition of claim 3 wherein said grape pomace waste is about 2.5 wt % to about 4 wt % of said composition.

5. The composition of claim 3 wherein said turmeric shavings and waste is about 4 wt % to about 8 wt %.

6. The composition of claim 3 wherein said coffee grounds is about 4 wt % to about 18 wt %.

7. The composition of claim 3 wherein said citrus peel is about 4 wt % to about 8 wt %.

8. The composition of claim 1 wherein said organic waste component is as received without promotion of said antioxidant component.

9. The composition of claim 1 wherein said polymer component is selected from polyolefins and copolymers thereof.

10. The composition of claim 9 wherein a said polyolefin is a polyethylene.

11. A composition comprising a polymer matrix component selected from polyolefins and copolymers thereof and an organic waste component dimensioned less than about 10 microns and dispersed in said matrix component, said waste component comprising an antioxidant component, said organic waste component in an amount sufficient to increase at least one of Young's modulus and yield strength of said composition relative to said polymer component.

12. The composition of claim 11 wherein said organic waste component is selected from grape pomace waste, turmeric shavings and waste, coffee grounds and citrus peel and combinations thereof.

13. The composition of claim 12 wherein said organic waste component amount is about 4 wt % to about 12 wt % of said composition.

14. The composition of claim 11 wherein said organic waste component is as received without promotion of said antioxidant component.

15. The composition of claim 11 wherein a said polyolefin is a polyethylene.

16. A composition comprising a polymer matrix component and an organic waste component selected from grape skin pomace waste, turmeric waste, coffee grounds and citrus peel and combinations thereof, said organic waste component comprising an antioxidant component, said organic waste component dispersed in said polymer matrix component.

17. The composition of claim 16 wherein said organic waste component is about 2 wt % to about 20 wt % of said composition.

18. The composition of claim 17 wherein said grape skin pomace waste is about 2.5 wt % to about 4 wt % of said composition.

19. The composition of claim 17 wherein id turmeric waste is about 4 wt % to about 8 wt %.

20. The composition of claim 17 wherein said coffee grounds is about 4 wt % to about 18 wt %.

21. The composition of claim 17 wherein said citrus peel is about 4 wt % to about 8 wt %.

22. The composition of claim 16 wherein said organic waste component is as received without promotion of said antioxidant component.

23. The composition of claim 16 wherein said polymer component is selected from polyolefins and copolymers thereof.

24. The composition of claim 23 wherein a said polyolefin is a polyethylene.

25. A composition comprising a polymer matrix component and an organic waste component dispersed in said matrix component, said waste component selected from coffee grounds and citrus peel, said waste component comprising an antioxidant component, said organic waste component in an amount sufficient to raise the thermal degradation/percent of mass loss temperature of said composition relative to said polymer component.

26. The composition of claim 25 wherein said organic waste component amount is about 2 wt % to about 20 wt % of said composition.

27. The composition of claim 25 wherein said organic waste component is as received without promotion of said antioxidant component.

28. The composition of claim 25 wherein said polymer component selected from polyolefins and copolymers thereof.

29. The composition of claim 28 wherein a said polyolefin is a polyethylene.

* * * * *